Feb. 16, 1971  KEN MATSUI  3,562,917
APPARATUS FOR MEASURING IRREGULAR SURFACES OF DEPOSITS
OF CONCRETE BLOCKS OR RUBBLE MOUNDS
Filed June 5, 1968  2 Sheets-Sheet 1

INVENTOR
Ken Matsui

BY George B. Auyerolle
ATTORNEY

United States Patent Office 3,562,917
Patented Feb. 16, 1971

3,562,917
APPARATUS FOR MEASURING IRREGULAR SURFACES OF DEPOSITS OF CONCRETE BLOCKS OR RUBBLE MOUNDS
Ken Matsui, Nagoya-shi, Japan, assignor to Nippon Tetrapod Co., Ltd., Tokyo, Japan, a corporation of Japan
Filed June 5, 1968, Ser. No. 734,600
Int. Cl. G01b 3/00, 5/20; G01c 7/00
U.S. Cl. 33—126.5                                4 Claims

ABSTRACT OF THE DISCLOSURE

Apparatus for measuring an irregular surface of a deposit is comprised by a perforated or grid shaped circular or polygonal flat plate or frame structure with a measuring point at the center thereof and a layer of tetrapods deposited on the irregular surface, all of one size which is such that the frame member will cover at least two of them, to obtain by sounding the layer with the frame, a reliable measurement of the general configuration or envelope of extremely irregular surfaces. The tetrapods may be incorporated in a structure which is built up on the irregular surface, as in repairing a breakwater.

BACKGROUND OF THE INVENTION

This invention relates to an apparatus for measuring extremely irregular surfaces such as those of rubble mounds, concrete blocks, particularly tetrapods utilized to build such structures as sea banks, breakwaters and the like, and more patricularly to a novel measuring apparatus utilized to determine the configuration of damaged cross-section when blocks used to build these structures are damaged by waves whereby to calculate the quantity or number of blocks required to repair them.

Where concrete blocks or rubble mounds utilized to build sea banks or breakwaters are damaged it is important to measure the damaged cross-section in order to lay a repairing plan. However, such measurement is considerably difficult because it involves cross-section of deposits of extremely irregular concrete blocks.

Heretofore, when measuring the cross-section of damaged structures submerged in water, a tool made of lead and weighing about 3 kilograms (usually called as a "lead"), as shown in FIG. 1, has been utilized. More particularly, a lead is suspended from a boat afloat at sea to the uppermost concrete block or rubble mound remaining in sea to determine the position of the lead sitting on the concrete block. Such measurements are performed at a suitable spacing to obtain a plane which is drawn after making a suitable correction of an envelope of blocks under the sea as shown in FIG. 2 by a dot and dash line interconnecting × marks, and the damaged cross-section is calculated based on this plane. However, with this method of using the lead it is very difficult to stably position it on the uppermost concrete block by manipulating it from the surface of sea. Thus for example, the lead happens to drop into the space or gap between adjacent concrete blocks thus making it difficult to determine an accurate cross-section. Consequently, at present, a hydroscope is employed to supervise the lead or the suspended position of the lead is determined by a diver. These measures require a large amount of labour and time and hence are inefficient and uneconomical. In muddy water these methods are not effective so that measurements must entirely depend upon intuition and experience.

SUMMARY OF THE INVENTION

This invention contemplates to obviate various defects of the prior art mentioned above and to make it possible to obtain measurements in terms of planes instead of points. Thus, it is the object of this invention to provide a new and improved apparatus capable of readily and correctly measuring extremely irregular cross-sections such as the cross-sections of damaged structures.

Briefly stated, the apparatus for measuring an irregular surface of a deposit of concrete blocks or rubble mound includes a preforated or grid shaped circular or polygonal flat plate or frame structure with a measuring point at the center thereof. The dimension and configuration of the plate or frame structure are selected such that it is supported by two adjacent blocks and that portions of concrete blocks or tetrapods will not extend through it. When placed on a deposit submerged in water, the plate is supported by at least two adjacent blocks and the depth of the measuring point is measured. By plotting the depth, a curve simulating an envelope of the deposit can be obtained. From this plot the cross-section of the deposit is determined, and when repairing a damaged structure the number of blocks required to be supplemented can be readily determined.

While there is no limit for the configuration of the plate it is advantageous to shape it as a circular or equilateral triangular configuration in order to readily determine its geometrical center.

BRIEF DESCRIPTION OF THE DRAWINGS

These features of the invention which are believed to be novel are specifically set forth in the claims attached hereto. The invention will, however, be better understood and further advantages thereof appreciated from a consideration of the following description and drawings, in which:

DESCRIPTION OF PREFERRED EMBODIMENTS

Figure 3:
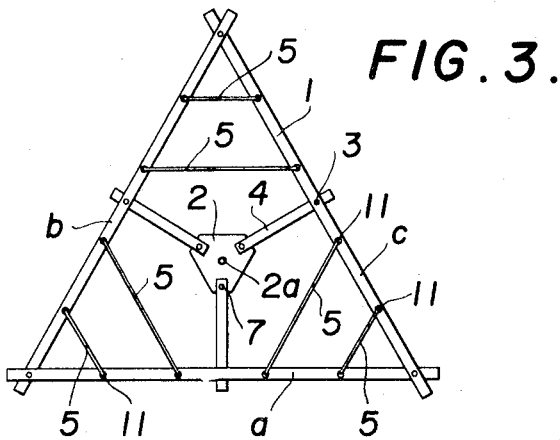
FIG. 3 is a plan view of one embodiment of the novel measuring apparatus.
Figure 4:
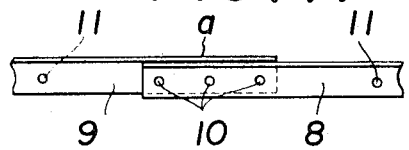
FIG. 4 is an enlarged perspective view of a portion of the apparatus as shown in FIG. 3.

As shown in FIG. 3, one example of the novel measing apparatus comprises a frame structure 1 of an equilateral triangular configuration formed by three sides a, b and c and a board 2 including the geometrical center of measurement 2a of the frame structure 1. The board 2 is held in position by three levers 4 connected to board 2 and respective sides by bolts (not shown) passing through threaded openings 3 and 7. Adjacent sides are interconnected by three sets of parallel ropes 5, the spacing between parallel ropes being smaller than the diameter of the outer end of one leg of a tetrapod. In other words, these ropes are provided to prevent the outer end of the leg of the tetrapod from extending through the frame structure so that the number and position of the cables are determined dependent upon the physical dimension of the tetrapod. FIG. 4 shows an enlarged view of a portion of one side of the frame 1 in which the length of the side is made adjustable dependent upon the dimension of a body to be measured. Thus, for example, the side a comprises two members 8 and 9 each provided with openings 10 adapted to receive suitable connecting such as bolts. In this manner, the length of the side can be varied by adjusting the relative position between members 8 and 9 and then fastening them together by means of wing nuts (not shown) for example. Other sides $b$ and $c$ can be adjusted in the same manner. Each side is provided with suitably spaced openings 11 to securely connect the end of ropes 5. These openings can also be used to adjust the length of the side.

Figure 5:
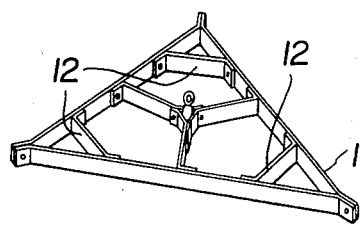
FIGS. 5, 6 and 7 show modified embodiments of this invention.

FIG. 5 shows a modified embodiment of the measuring apparatus constructed in accordance with this invention. In this embodiment, connecting members 12 in the form of rods or bars are substituted for the ropes 5 shown in FIG. 3.

Figure 6:
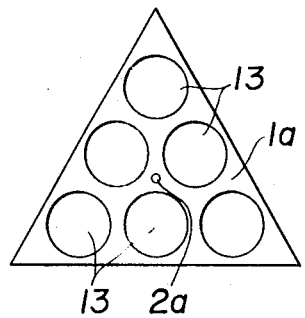

In the modification shown in FIG. 6, an equilateral triangular plate 1a is employed. The plate 1a is provided with a number of perforations in order to reduce the resistance of water when it is submerged into or taken out from water.

Figure 7:
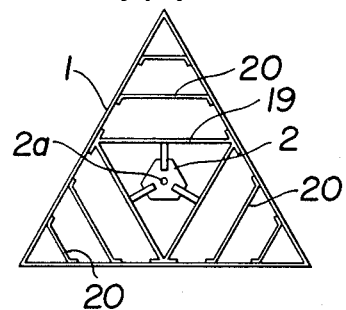

In yet another modification shown in FIG. 7 a small equilateral triangular frame is inscribed to the outer triangular frame 1, adjacent sides thereof being connected together by suitable connecting members 20 as before. In this case the center board 2 is supported within the smaller frame 19. In this manner, particular construction and dimension of the frame structure may be varied to suit any dimension and construction of a particular body to be measured. The measuring apparatus is in the form of a grid or a network to reduce the resistance of water. While there is no limit on the type of the material for the frame structure, in order to speed up sinking, it is important that the frame structure should have a certain weight. For this reason, metals, particularly metals resistant to corrosion of sea water are preferred. Ropes utilized to form a network together with a frame or frames may be made of metals, synthetic resins or fibrous materials.

Figure 1:
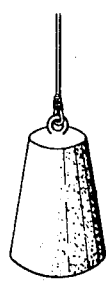
FIG. 1 shows a perspective view of a prior art measuring tool.
Figure 2:
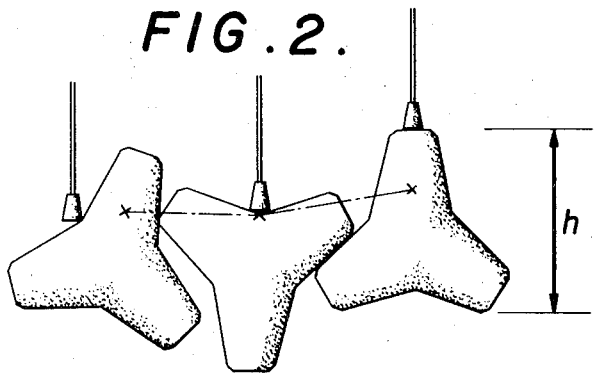
FIG. 2 shows a result of measurement obtained by employing the tool shown in FIG. 1.

The length of one side $a$, $b$ or $c$ of the triangular measuring apparatus may be selected to any desired length dependent upon the size of the block to be measured. Taking a tetrapod as an example, this length is suitably about 1.0 to 1.5 times the height $h$ (see FIG. 2) of one tetrapod. Where a number of tetrapods are deposited the space between them is usually about 50% of the whole deposit. Said length of one side is necessary in order to prevent the measuring apparatus from dropping into such space. In other words, the value of the length of one side is required to be sufficient to measure a plane enveloping a deposit of tetrapods. The frame structure may be constructed by connecting together respective sides by suitable means or by bending a length of single member.

Figure 8:
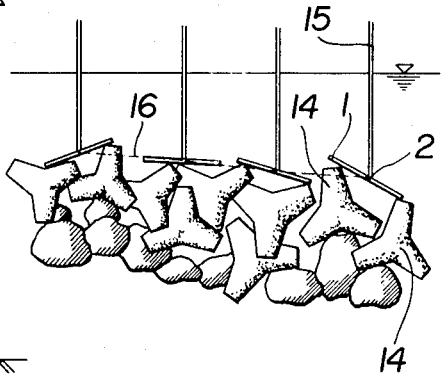
FIG. 8 is a diagrammatic representation of one example of a method of employing the novel measuring apparatus.
Figure 9:
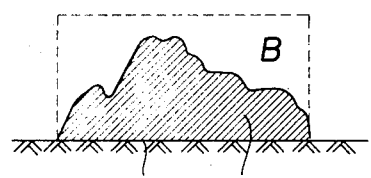
FIG. 9 is a graph to show a result of measurement.

One example of using the novel measuring apparatus for deposit of tetrapods is as follows:

As shown in FIG. 8, to determine the envelope plane of a deposit of tetrapods submerged in water, a rope 15 provided with a scale (not shown) is connected to the center 2a of board 2 and the measuring apparatus 1 is suspended onto the deposit of tetrapods 14. As mentioned above, as the length of one side of the frame structure is nearly equal to or slightly larger than the height of respective tetrapods, the frame structure will be mounted upon at least two adjacent tetrapods 14. After setting, the rope 15 is tensioned vertically to measure the depth of the tetrapods. In this manner, the depths of various tetrapods are measured at a suitable spacing and a curve 16 is plotted by connecting the positions of the center of the measuring apparatus, thus determining the position of the envelope plane of the deposit of tetrapods at a definite position. Thus, as shown in FIG. 9, the number of tetrapods in the cross-section A consisting of a deposit of the tetrapods on a known foundation 17 or that of the tetrapods contained in an assumed cross-section B to be supplemented can be calculated by multiplying a volume corresponding to the product of said cross-section A or B and the spacing between measured points with an inherent space factor of the deposit of the tetrapods, and then dividing the product thus obtained with the volume of a single tetrapod. Thus $$N = \frac{V \times r}{v}$$

where $N$ = the number of tetrapods to be determined,
$V$ = the volume (in m.$^3$) calculated by the result of measurement,
$v$ = the volume (in m.$^3$) of a single tetrapod, and
$r$ = the space factor of a deposit of tetrapods (0.50).

Following is an example of experiment made by utilizing an equilateral triangular measuring apparatus.

As shown in FIG. 9, at first the cross-section A of the deposit of tetrapods was measured by utilizing the novel measuring apparatus and then the cross-section B required to repair the damaged structure was assumed and respective results of calculations and the number actually required or the number supplemented were compared as shown in the following table.

TABLE

| Cross-section | A | A | A | A | A | B |
|---|---|---|---|---|---|---|
| Weight of tetrapods (ton) | 1 | 1 | 4 | 8 | 8 | 8 |
| Result of measurement (number of pieces) | 194.6 | 206.3 | 80.1 | 82.6 | 68.2 | 65.1 |
| Number of pieces actually required | 200 | 200 | 80 | 80 | 70 | 68 |
| Percentage error (percent) | −2.8 | +2.9 | +0.1 | +3.2 | −2.6 | −4.4 |
| Length of one side of measured plate ($h$) [1] | 1.0 | 1.5 | 1.5 | 1.0 | 1.5 | 1.5 |

[1] $h$ = the height (in meters) of one tetrapod.
Remarks: Model of the size of 1/25 of the actual size was used.

Figure 10:
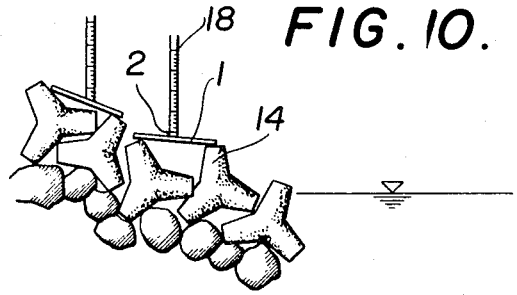
FIG. 10 shows another method utilizing the novel measing apparatus.

This table shows that the percentage error is very small.

Where the cross-section of a structure on the ground is to be measured, the measuring apparatus 1 is mounted upon adjacent tetrapods 14, a rule 18 is placed vertically at the center 2a of the measuring apparatus and its height is measured as shown in FIG. 10. Thereafter the envelope of the deposit can be readily determined in a manner as described hereinbefore in connection with FIG. 8 to calculate the desired cross section.

While equilateral triangular measuring apparatus has been shown and described, it should be understood that the measuring apparatus may be circular or polygonal. Further, with novel measuring apparatus high accuracy of measurement can be obtained and as a relatively wide surface of the deposit is measured, the number of measuring points can be reduced. Even when water is muddy so that the measuring apparatus can not be seen from a ship, accurate measurement can be made, thus enabling simple plotting as well as calculation with less labour and time. In addition the measuring apparatus itself is very light, and can be disassembled so that it is convenient to transport. Result of experiment shows that variation in the dimension of the body to be measured does not materially affect the dimension of the measuring plate, so that the dimension of the latter is not required to be very close.

While the invention has been explained by describing particular embodiments thereof, it will be apparent that improvements and modifications may be made without departing from the scope of the invention as defined in the appended claims.

What is claimed is:
1. An apparatus for measuring the irregular surface of an underwater deposit, comprising in combination;
    (a) rope means (15);
    (b) a flat frame structure (1) suspended from said rope means of equilateral configuration having at least three sides;
    (c) a center board (2) in said structure including a geometric center of measurement (2a) and a plurality of levers (4) connected to the board and said frame;
    (d) holding lines (5) connecting adjacent sides of said frame;
    (e) a plurality of tetrapods deposited on said underwater surface, sized so that said frame member will cover at least two tetrapods when placed thereon.
2. An apparatus as claimed in claim 1 wherein the sides of said frame structure are adjustable.
3. An apparatus as claimed in claim 1 wherein said structure is a polygonal structure.
4. An apparatus as claimed in claim 1 wherein said structure is a triangular structure.

References Cited

UNITED STATES PATENTS

| 935,187 | 9/1909 | Burgess | 98—114 |
| 1,117,568 | 11/1914 | Hart | 98—114UX |
| 1,264,584 | 4/1918 | Berson | 98—114UX |
| 1,559,837 | 11/1925 | Allen | 52—663X |
| 1,788,721 | 1/1931 | Klomparens | 98—114 |
| 1,913,023 | 6/1933 | Farrell | 33—126.5X |
| 2,556,279 | 6/1951 | Johnson | 114—206 |
| 2,589,913 | 3/1952 | Wenner | 114—206 |
| 2,861,534 | 11/1958 | Fehlner | 114—209 |

FOREIGN PATENTS

| 351,548 | 5/1905 | France | 33—126.5 |
| 844,835 | 7/1952 | Germany | 33—126.6 |

ROBERT B. HULL, Primary Examiner

U.S. Cl. X.R.

33—1; 73—432; 114—206